United States Patent [19]

Mares et al.

[11] Patent Number: 4,487,436
[45] Date of Patent: Dec. 11, 1984

[54] CARDAN-TYPE PIPE JOINT WITH COMPENSATION FOR LONGITUDINAL EXPANSION

[75] Inventors: Otakar Mares, Baden; Urs Ritter, Stüsslingen, both of Switzerland

[73] Assignee: BBC Brown, Boveri & Company, Limited, Baden, Switzerland

[21] Appl. No.: 346,936

[22] Filed: Feb. 8, 1982

[30] Foreign Application Priority Data

Feb. 17, 1981 [CH] Switzerland .................. 1022/81

[51] Int. Cl.³ ............................................. F16L 51/02
[52] U.S. Cl. .................. 285/228; 285/DIG. 1
[58] Field of Search .............. 285/114, 226, 227, 228, 285/264, 265, DIG. 1

[56] References Cited

U.S. PATENT DOCUMENTS 3,066,960 12/1962 Adams .................................. 285/114
3,179,447 4/1965 Parr et al. ......................... 285/226 X
3,915,482 10/1975 Fletuher ............................. 285/226

FOREIGN PATENT DOCUMENTS 609137 11/1960 Canada .
809656 2/1959 United Kingdom ................ 285/226
46201 1/1962 U.S.S.R. ............................... 285/226

Primary Examiner—Dave W. Arola
Attorney, Agent, or Firm—Werner W. Kleeman

[57] ABSTRACT

The cardan-type pipe joint possesses elements which allow two pipe sections to execute angular deflections and, in addition, to shift longitudinally.

9 Claims, 13 Drawing Figures

CARDAN-TYPE PIPE JOINT WITH COMPENSATION FOR LONGITUDINAL EXPANSION

BACKGROUND OF THE INVENTION

The present invention relates to a new and improved cardan-type pipe joint with compensation for longitudinal expansion.

Generally speaking, the cardan-type pipe joint of the present development is of the type possessing flanges for the attachment of main pipe sections which are to be connected, and at least one corrugated pipe interposed between the above-mentioned flanges. This corrugated pipe permits the flanges to shift with respect to each other in the longitudinal direction. There is also provided a cardan joint with two pairs of bolts, which enables the flanges to execute angular movements relative to each other.

In steam turbine plants where the steam under-goes interstage superheating before it enters the low-pressure section of the plant, the connecting line between the interstage superheater and the low-pressure turbine or turbines, conventionally comprises two or three pipe sections, the joint-members between these sections being designed in such a manner that the latter can yield, as far as possible without resistance, to the changes in length and angle which are caused by the thermal expansions. It is conventional practice to use three joint-elements which can move according to the cardan principle, two or these elements being attached, respectively, to the casing or shell of the interstage superheater and the casing of the low-pressure turbine, while the third and central element connects the pipe sections which are attached to the first two joint-elements. This type of design requires no length compensation, since the changes in length are taken up by the central joint-element, which can shift freely.

Another conventional design requires only two connection or joint-elements, one of which is seated on the turbine casing, and the other on the casing or shell of the interstage super-heater, and which are connected by a single pipe. Since, in this design, the two joint-elements are spatially fixed, one of them must allow the pipe, which is located between them, to expand or contract in the axial direction, as its temperature varies. The joint-element provided for this purpose, a so-called "universal compensator", is a component or structure involving considerable expense and which, as a result of its design, requires a large amount of space in the axial direction of the connecting line between the turbine and the interstage superheater.

This last-mentioned disadvantage is shared by the connecting line employing "universal compensators" and the first-mentioned design employing three cardan-type joint elements. The large amount of space required by the connecting line, which is always arranged horizontally, determines the distance between the turbine and the interstage superheater, and thereby also determines the site-area requirement for the plant and the dimensions of the machinery hall.

A further disadvantage of the "universal compensator" resides in the fact that its resistance to movement, especially to transverse movements, is relatively high, this being due to its structure, incorporating a system of rods, which connects the ends of the pipes. This resistance can cause harmful distortions to occur during operation, leading to overstressing of the material.

SUMMARY OF THE INVENTION

Therefore, with the foregoing in mind, it is a primary object of the present invention to provide a new and improved construction of cardan-type pipe joint with compensation for longitudinal expansion, which is not afflicted with the aforementioned drawbacks and limitations of the prior art constructions.

Another and more specific object of the present invention is directed to a cardan-type pipe joint which enables providing a steam supply line for connecting an interstage superheater to a low-pressure turbine, in a manner avoiding the above-mentioned limitations of the state-of-the-art constructions of compensators, and furthermore, permit shorter overall plant lengths than those of the known designs for the same steam flow and/or the same flow cross-section, in order to be able to maintain the site-area requirement for the turbine plant and the machinery hall smaller, with the appertinent result that there are realized significant savings in construction costs.

Yet a further noteworthy object of the present invention is directed to a new and improved construction of a cardan-type pipe joint structured to enable compensation for longitudinal expansion, this pipe joint being of relatively simple design, econical to manufacture, extremely reliable in operation and for fulfilling its intended purpose, and requiring a minimum of maintenance and servicing.

Now in order to implement these and still further objects of the invention, which will become more readily apparent as the description proceeds, the cardan-type pipe joint of the present development is manifested by the features that the pairs of bolts belonging to the same cardan joint are mounted so that they can shift, relative to one another, in longitudinal direction of the central axis of the flanges.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
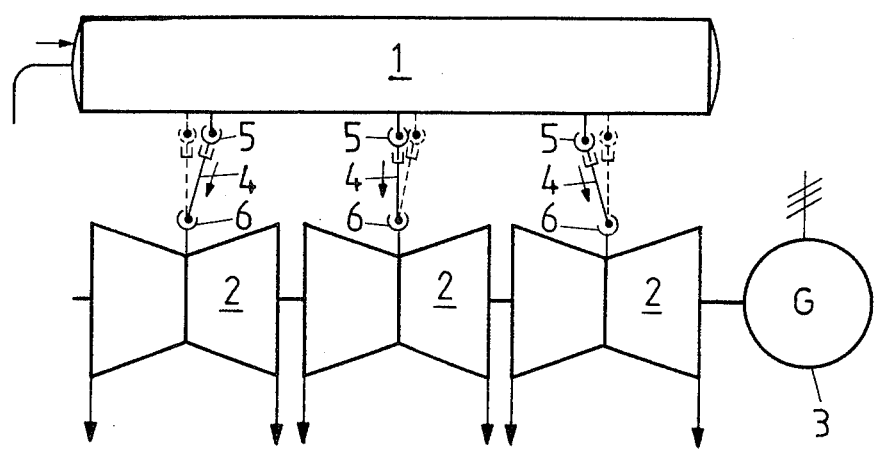
FIG. 1 shows, diagrammatically, a general arrangement sketch, from which it is possible to discern the arrangement of the connecting lines in a turbine plant, these lines being coupled together by means of pipe joints of the type to which the present invention relates.

Describing now the drawings, FIG. 1 shows, diagrammatically, the low-pressure section of a steam turbine plant or installation, including the associated water-separator/interstage superheater 1. The three low-pressure turbines 2 which, together with the medium-pressure and high-pressure stages not depicted in the Figure, drive the generator 3, are connected to the water-separator/interstage superheater 1, in a manner enabling steam to be conveyed, by steam supply lines or conduits 4. In order to compensate the different thermal expansions of the plant components or units 1 and 2, and of the steam supply lines 4 themselves, the two pipe joints or connections 5 and 6 must permit both angular displacements and changes in length, in order to avoid distortions in the structure of the steam supply lines 4, and at the connections of these lines 4 to the casing or shell of the water-separator/interstage superheater 1 and the casing of the related turbines 2.

The pipe joints or connections 6, which, in FIG. 1, are seated on the respective turbines 2, need be capable only of permitting spatial angular displacements, so that they can therefore be designed in the form of cardan-type pipe joints of a known type.

In the case of the respective pipe joints or connections 5 provided at the water-separator/interstage superheater 1, such pipe joint is of the cardan-type design, with compensation for longitudinal expansion, according to the present invention, this compensation being implemented by means of the telescopic coupling or sliding collar which is shown in the diagrammatic representation of this pipe joint connection.

It would be possible, of course, to fit the pipe joint 5 at the position occupied by the pipe joint 6, and vice versa.

Figure 2:
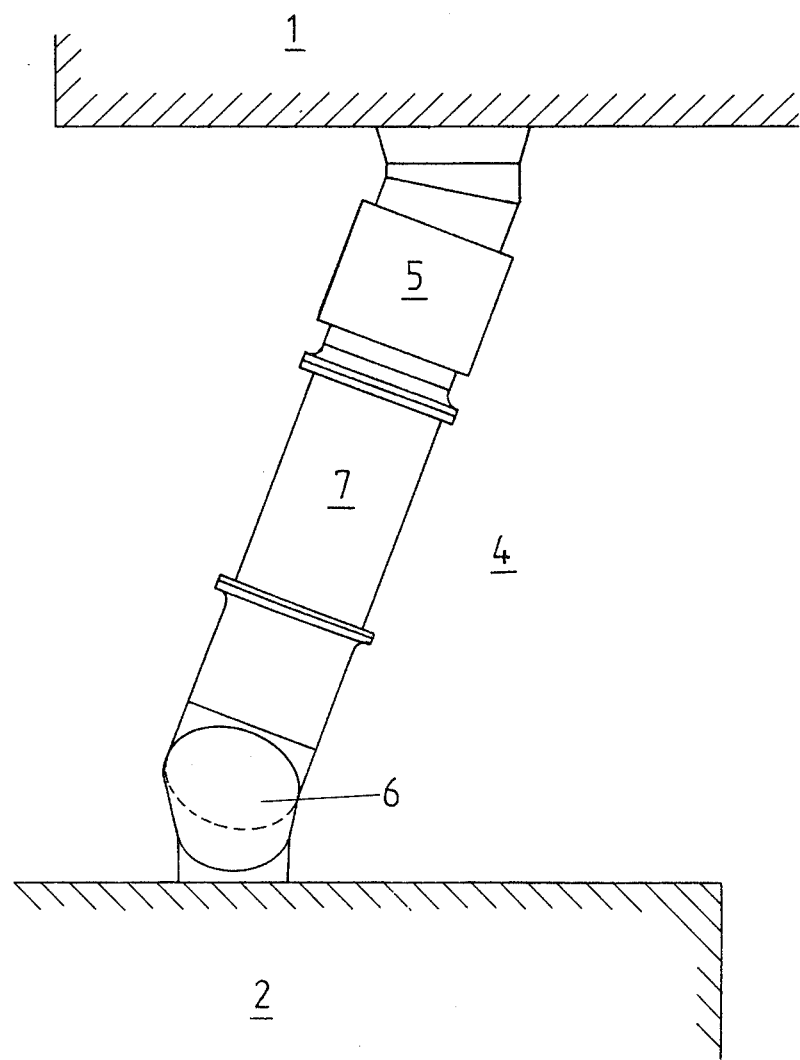
FIG. 2 shows, in a simplified representation, the horizontal projection or plan view of a connecting line of this type.

The outline of a steam supply line or conduit of this type is shown, in plan view or horizontal projection, in FIG. 2, from which the relative proportions of its individual parts can be seen. In the practical design, the central section or portion 7 of this steam line, located between the two joints or connections 5 and 6, contains a suitable shut-off device, but this device is not particularly represented, as it does not form part of the present invention.

Figure 3:
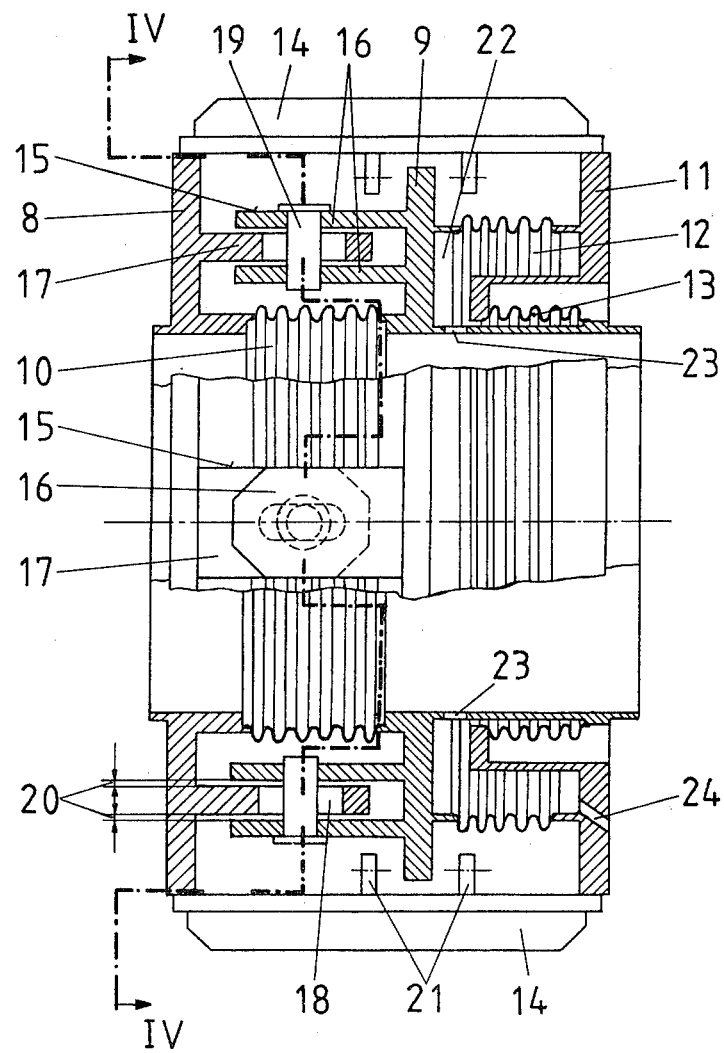
FIG. 3 shows an illustrative embodiment of the pipe joint or connection according to the invention, with a compensating flange for the longitudinal force, in a partially-sectional view.

A specific illustrative embodiment of a cardan-type pipe joint with compensation for longitudinal expansion is shown in FIG. 3, in a partially-sectional representation. A narrow region on both sides of the longitudinal axis is represented in elevation, with webs 14 omitted, the function of these webs being described below.

A flange 8, on the superheater side, and a flange 9, on the turbine side, are connected by a corrugated pipe 10, which is located on the superheater side.

An additional flange 11, which surrounds the flange 9 on the turbine side, serves as a compensating flange for the longitudinal force which is produced by the pressure of the steam, and is connected to the flange 9, which is on the turbine side, via a corrugated compensating pipe 12 and an inner corrugated pipe 13 on the turbine side. As is evident from the plan view shown in FIG. 4, which represents a section according to the section line IV—IV appearing in FIG. 3, the external outlines of the flanges 8 and 11 are congruent and octagonal, but with sides of different lengths, two adjacent sides having, in each case, different lengths. The four shorter sides of these flanges 8 and 11 are interconnected by means of T-section webs 14, over approximately the width of these shorter sides of the octagon, these webs 14 being arranged parallel to the axis. The flanges 8 and 11, together with the webs 14 which interconnect them, consequently form a rigid frame, inside which the flange 9 on the turbine side, and the corrugated pipes 10, 12 and 13 or equivalent structure can, within certain limits, be pivoted, shifted axially, and displaced at right-angles to the lengthwise axis of the main pipe, in accordance with the statement of the problem initially described. Up to a certain degree, these limits are determined by the amount by which the corrugated pipes 10, 12 and 13 can be permitted to deform without being overloaded. In order to protect these pipes 10, 12 and 13 from being overstressed or overloaded, rigid stops or impact facilities are provided, here shown in the form of four fork-joints 15, which are provided at positions radially inward from the webs 14 and comprise, in each case, two fork-links 16, which form the forks or fork proper and are integral with the flange 9 on the turbine side, and also comprise, in each case, a simple or single link 17 which is integral with the flange 8 on the superheater side. These links 17 are each provided with elongated holes or openings 18, the width of which essentially corresponds to the diameter of the bolts 19, while their length is at least sufficient to ensure that there is no obstruction to the maximum angular deflections and axial shifting movements to be expected during operation.

In this design, sufficient play 20, in the direction of the bolt axis, must be provided between the fork-links i.e. the double links 16 and the simple or single links 17, in order to permit pivoting movements about the mutually associated pairs of bolts 19.

If the elongated holes or opening 18 are wider than the diameter of the bolts 19, it is also possible for the axes of the two flanges 8 and 9 to be displaced.

Stop-tabs or brackets 21 or equivalent structure are provided on the webs 14, these tabs 21 serving to receive screws or threaded bolts or the like which enable the flange 9 to be fixed, relative to the flange 8, during transportation, or during repairs, and so forth, in order to prevent the corrugated pipes from being stressed or loaded.

The task of the compensating flange 11 is to ensure, in a known manner, that the pipe sections, which are here not shown, but which are connected to the flanges 8 and 9 and produce the connection to the water-separator/interstage superheater 1 and to the turbine casing of the turbines 2, respectively, are kept in an unstressed state i.e. free of forces. For this purpose, the projections, parallel to the axis, of the compensating chamber 22, which is bound by the flange 9 on the turbine side, the compensating flange 11, the corrugated compensating pipe 12, and the corrugated pipe 13 on the turbine side, are annular or ring-shaped surfaces having the same area as the flow cross-section of the steam supply line.

The forces, due to the pressure of the steam, which act, on the one hand, on the water-separator/interstage superheater 1 and the turbine 2 and, on the other hand, on the compensating flange 11 and the flange 9 on the turbine side, are consequently balanced, thereby eliminating the corresponding reactions on the foundations of the water-separator/interstage superheater 1 and of the turbine 2.

The compensating chamber 22 communicates with the steam supply line via a number of compensating holes or openings 23, which are drilled or otherwise appropriately machined at intervals around the periphery. A water drain hole 24 is present at the lowest point of the compensating chamber 22, in order to remove the condensate.

Figure 4:
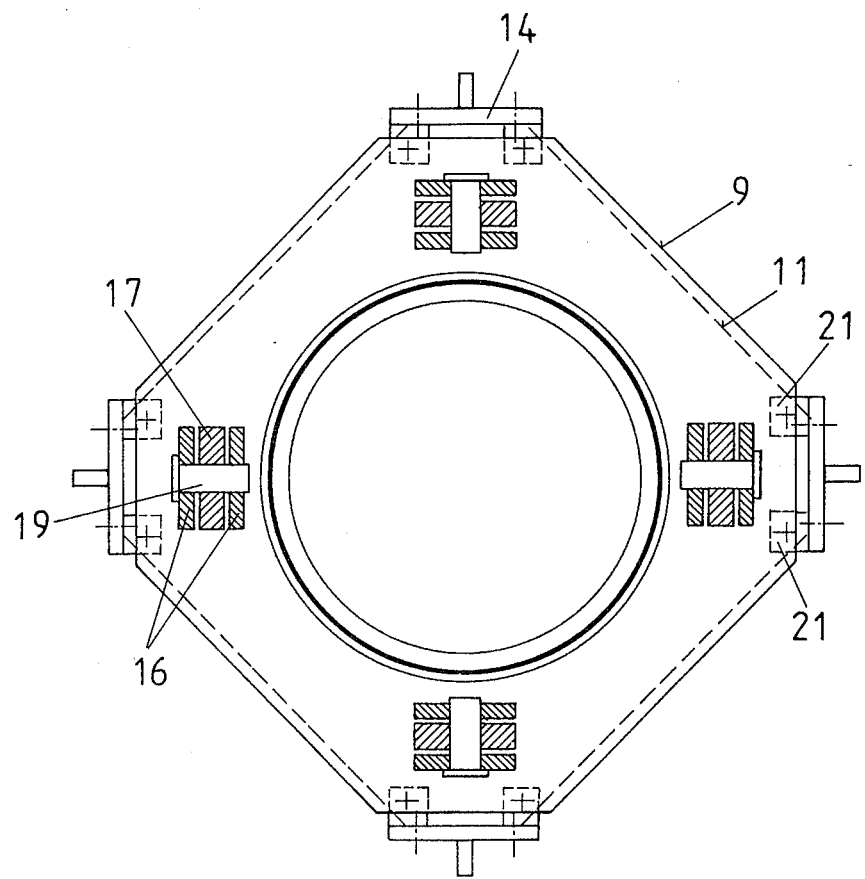
FIG. 4 is a plan view of FIG. 3, taken substantially along line IV—IV thereof.
Figure 5:
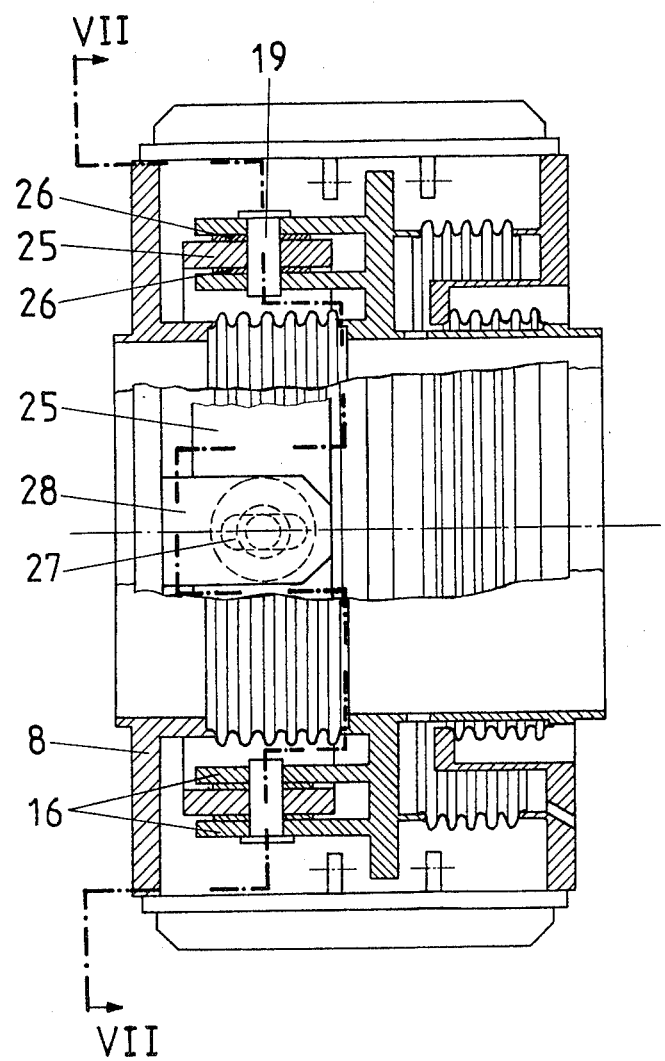
FIG. 5 illustrates another exemplary embodiment of the pipe or connection or joint with compensating flanges, in a partially sectional view.
Figure 6:
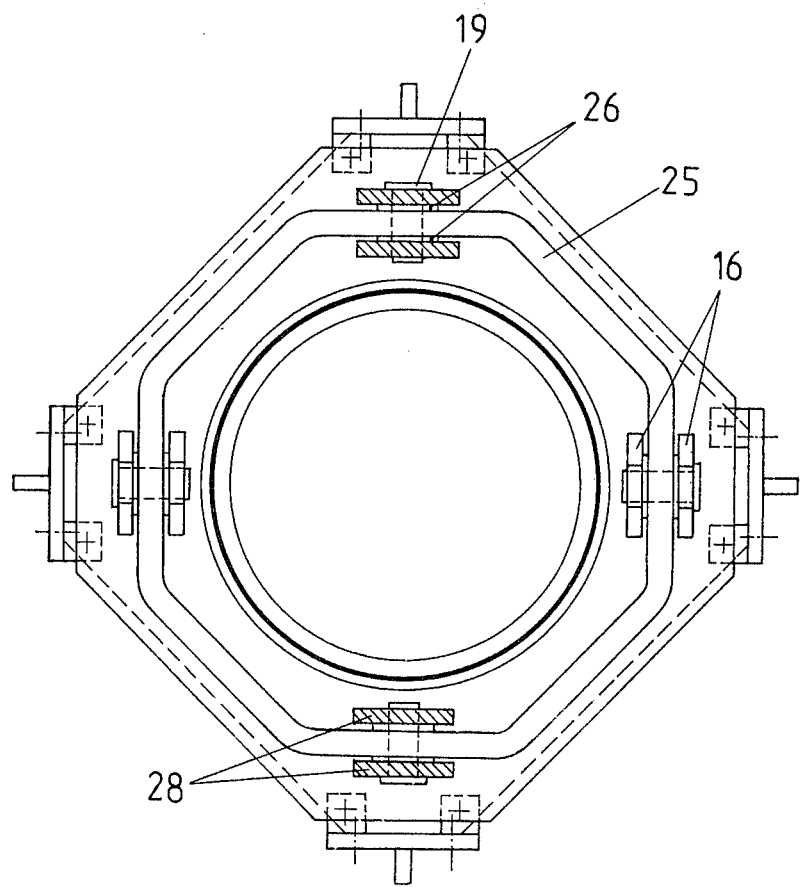
FIG. 6 shows a plan view of the arrangement of FIG. 5, taken substantially along the line VI—VI thereof.

FIGS. 5 and 6 shown, by means of the same representation as in FIGS. 3 and 4, a design which employs a gimbal or cardan ring 25. With this embodiment, the ability to pivot in all directions would be present, even if the four bolts 19 were fitted without and play, and there is also no need for any appreciable play between the fork-links 16, the washers 26, and the gimbal ring 25.

However, on account of the requirement for an ability to shift in the axial direction, two of the mutually opposite bolts 19 must be mounted in elongated openings or holes, as can be seen from the plan view of the bolt 19, which is located above the central axis and is mounted, in a manner permitting longitudinal shifting, in an elongated hole 27 in the two fork-links 28 which are secured to the flange 8 on the superheater side.

Figure 7:
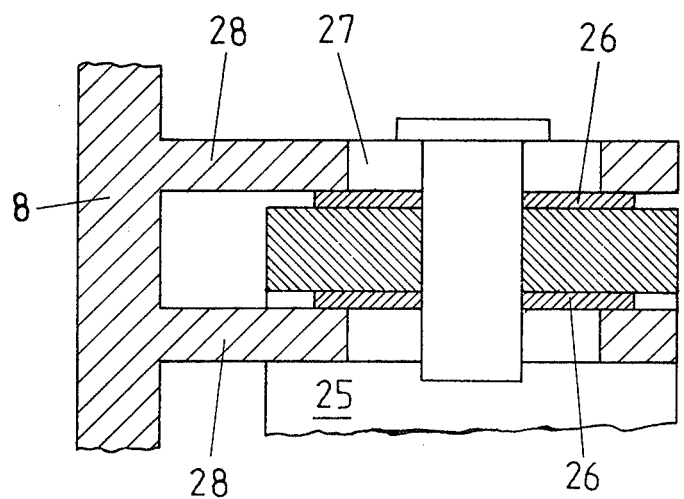
FIG. 7 shows a detail of the embodiment according to FIG. 5.

This mounting is represented in detail on a larger scale, in FIG. 7, corresponding to part of the section taken essentially along the VII—VII shown in FIG. 5. All the other components are of the same design as their counterparts represented in FIGS. 3 and 4.

Figure 10:
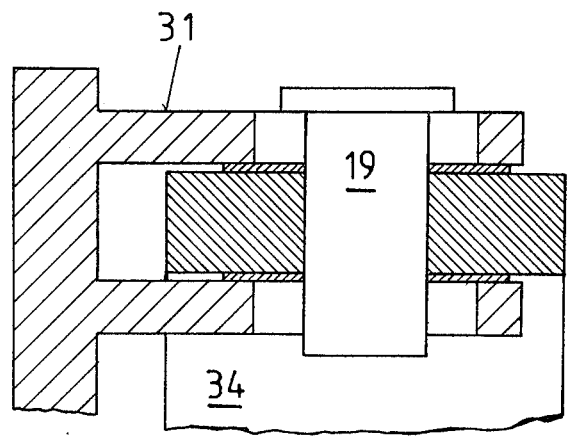
FIG. 10 is a detail of the embodiment according to FIG. 8.
Figure 8:
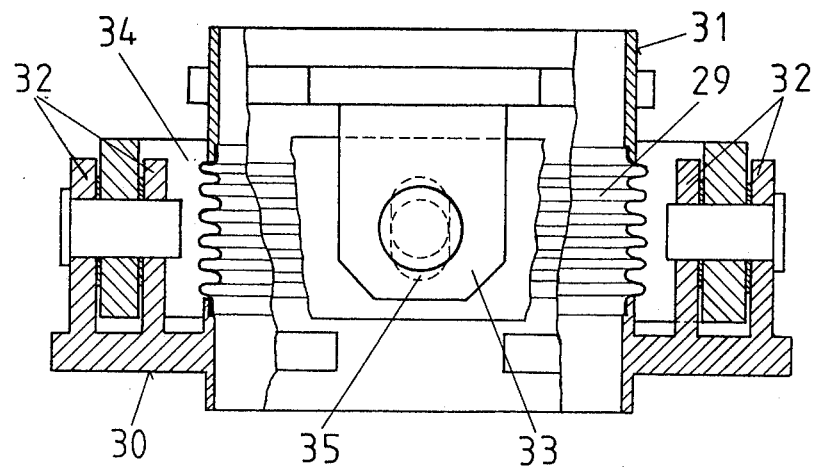
FIG. 8 shows an illustrative embodiment of the pipe joint, without a compensating flange, in partially sectional view.
Figure 9:
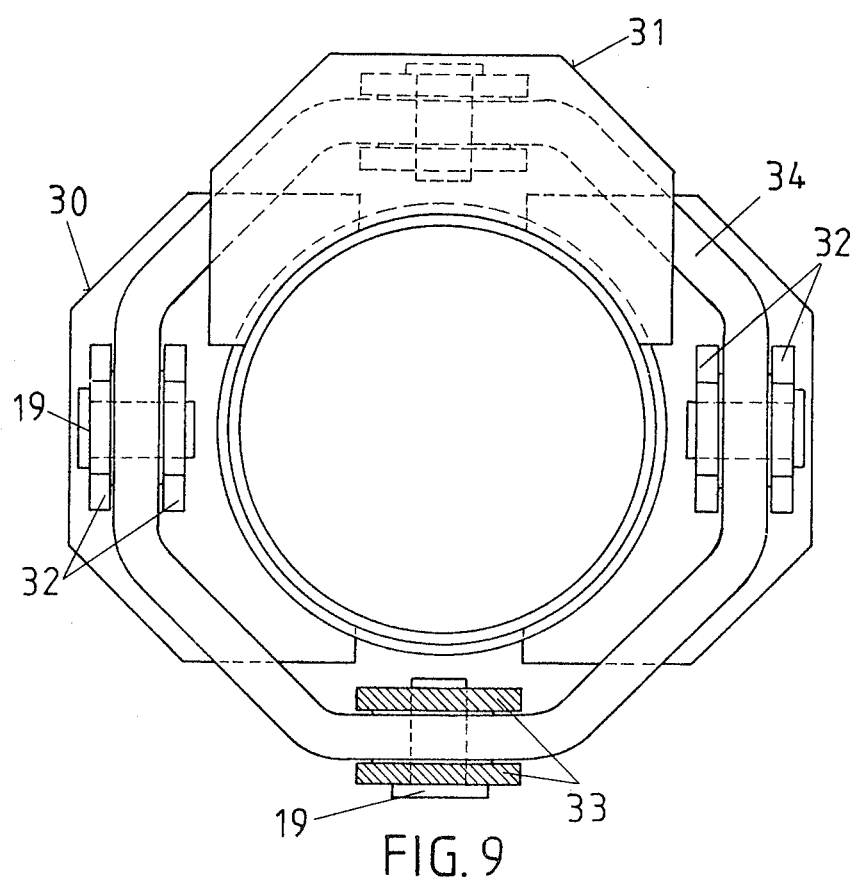
FIG. 9 is a plan view of the arrangement of FIG. 8.
Figure 11:
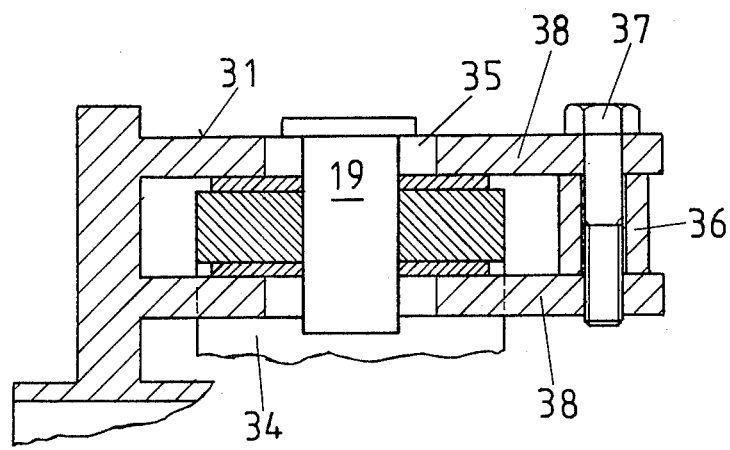
FIGS. 11 and 12 show a modified version of the detail according to FIG. 10, in elevation and in plan view, respectively.
Figure 12:
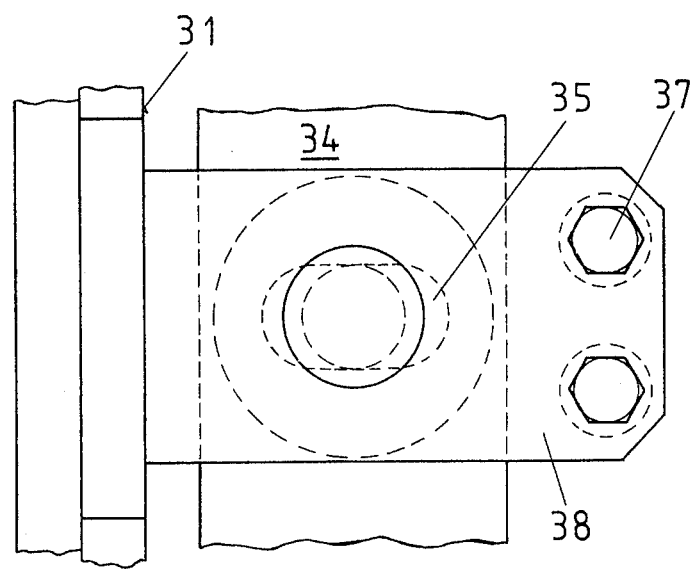

A simplified design, without longitudinal force compensation, is represented in FIGS. 8 and 9. This embodiment requires only one corrugated pipe 29, and both the flange 30 on superheater side, and the flange 31 on the turbine side, respectively possess two fork-links 32 and 33, in which a gimbal or cardan ring 34 is mounted by means of bolts 19. These bolts 19 are mounted, without play, in the fork-links 32 on the superheater side, while they seat in axially parallel elongated holes 35 in the fork-links 33 on the turbine side, these elongated holes providing the ability to shift parallel to the axis. This mounting is represented in detail in FIG. 10, on a larger scale. A modified version of this mounting is shown in FIGS. 11 and 12. In this modified version, the fork-links 38 on the turbine side, which are made longer, are positively protected against being pried or spread apart, by means of a distance-bush 36 and a threaded bolt or screw 37 or the like.

Figure 13:
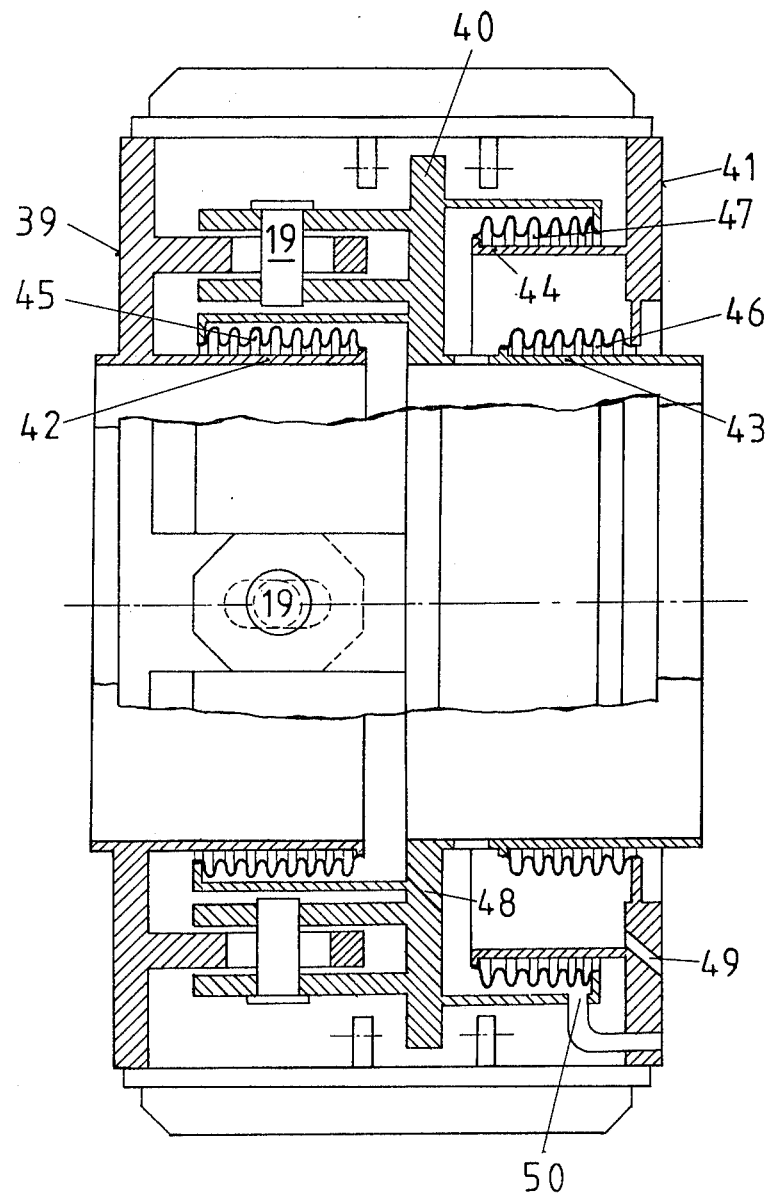
FIG. 13 illustrates another embodiment of the pipe joint with compensating flange.

FIG. 13 shows a modified version with longitudinal force compensation, this embodiment corresponding to the design according to FIGS. 3 and 4 with regard to the elements for the cardan-type mounting. All four bolts are thus mounted in elongated holes. However, this design differs from the last-mentioned design, and also from the design according to FIGS. 5 and 6, in that it employs modified flanges 39, 40 and 41. These flanges 39, 40 and 41 now possess supporting rings 42, 43 and 44, respectively, the corrugated pipes 45, 46 and 47 are fixed between the corresponding flanges 39 and 40, and 40 and 41, in such a way that they are always stressed or loaded in the radially inward direction by the pressure of steam.

They are supported against being overstressed or overloaded by the supporting rings 42, 43 and 44, but the main purpose of these measures lies in the avoidance of accumulations of water at the lowest points of the three corrugated pipes 45, 46 and 47, and avoidance of the sagging of these pipes caused thereby. As a result of these measures, the water drain holes or ports 48, 49 and 50 can be located in the solid material of the three flanges, here shown particularly at the solid material of the flanges 40 and 41.

The use of pipe joints of this type is not restricted to the application involving turbine plants, as described here by way of illustration and not limitation. They are fundamentally suitable for all pressurized lines, and especially lines which are subjected to thermal stresses, in which the ability to expand freely is indispensable. Design modifications of the designs described in this disclosure are, of course also feasible within the scope of the concept and principles on which the invention is based.

While there are shown and described present preferred embodiment of the invention, it is to be distinctly understood that the invention is not limited thereto, but may be otherwise variously embodied and practiced within the scope of the following claims. ACCORDINGLY,

What we claim is:

1. A cardan-type pipe joint with compensation for longitudinal expansion of two main pipe sections to be connected within a piping run, comprising:
   the pipe joint having a longitudinal axis;
   the pipe joint having a peripheral direction;
   the two main pipe sections to be joined having a longitudinal direction;
   a first pipe section and a second pipe section for attachment to said two main pipe sections;
   a first flange member provided for said first pipe section;
   a second flange member provided for said second pipe section;
   a corrugated pipe for permitting longitudinal motion of said flange members relative to one another by means of bellows action and having a first end and a second end;
   said first end of said corrugated pipe being fixedly attached to said first flange member;
   said second end of said corrugated pipe being fixedly attached to said second flange member;
   a cardan joint for permitting angular motions and axially longitudinal motions of said first flange member and said second flange member relative to one another and having two pairs of bolts;
   said two pairs of bolts being arranged substantially in a plane extending perpendicular to said longitudinal axis of the pipe joint and being spaced at substantially 90° from one another in said peripheral direction of the pipe joint;
   said first flange member being provided with fork links;
   said second flange member being provided with single links;
   each bolt of said two pairs of bolts bearing journaled in a respective one of said fork links as well as in a respective one of said single links engaging said respective one of said fork links;
   said two pairs of bolts being journaled to be translatable in said longitudinal direction of the two main pipe sections to be joined;

each bolt of said two pairs of bolts having a bolt axis;

said first and second flange members having a central axis;

said single links being provided with elongated slots having major axes extending in a direction substantially parallel to said central axis of said first and second flange member;

each bolt of said two pairs of bolts being journaled in said fork links substantially free of play in a direction substantially perpendicular to said bolt axis;

each bolt of said two pairs of bolts being translatably journaled in said elongated slots in said single links; and said single links engaging in said fork links with appreciable play in a direction extending substantially parallel to said bolt axes.

2. The cardan-type pipe joint as defined in claim 1, further including:

a compensation flange means for compensating longitudinal force arising from internal pressure;

web members arranged peripherally to the pipe joint; and said compensation flange means being rigidly connected to said second flange member by means of said web members.

3. The cardan-type pipe joint as defined in claim 1 further including:

a plurality of said corrugated pipes;

a respective supporting ring for each said corrugated pipe;

said supporting rings being arranged in spaced relationship substantially concentrically within said corrugated pipes; and said supporting rings being formed by said first and second pipe sections of said first and second flanges for attachment to said two main pipe sections.

4. A cardan-type pipe joint with compensation for longitudinal expansion of two main pipe sections to be connected within a piping run, comprising:

the pipe joint having a longitudinal axis;

the pipe joint having a peripheral direction;

the two main pipe sections to be joined having a longitudinal direction;

a first pipe section and a second pipe section for attachment to said two main pipe sections;

a first flange member provided for said first pipe section;

a second flange member provided for said second pipe section;

a corrugated pipe for permitting longitudinal motion of said flange members relative to one another by means of bellows action and having a first end and a second end;

said first end of said corrugated pipe being fixedly attached to said first flange member;

said second end of said corrugated pipe being fixedly attached to said second flange member;

a cardan joint for permitting angular motions and axially longitudinal motions of said first flange member and said second flange member relative to one another and having two pairs of bolts;

said two pairs of bolts being arranged substantially in a plane extending perpendicular to said longitudinal axis of the pipe joint and being spaced at substantially 90° from one another in said peripheral direction of the pipe joint;

said first flange member being provided with pairs of fork links;

said second flange member being provided with pairs of fork links;

a cardan ring engaging said pairs of fork links of said first flange member and said second flange member;

each bolt of said two pairs of bolts being journaled in a respective one of said pairs of fork links of said first flange member and said second flange member as well as in said cardan ring engaging said pairs of fork links;

said two pairs of bolts being journaled to be translatable in said longitudinal direction of the two main pipe sections to be joined;

a first pair of said two pairs of bolts being journaled substantially free of play;

said pairs of fork links of said first flange member being provided with elongated slots; and a second pair of said two pairs of bolts being longitudinally translatably journaled in said elongated slots in said pairs of fork links of said first flange member.

5. The cardan-type pipe joint as defined in claim 4, further including:

a compensation flange means for compensating longitudinal forces arising from internal pressure;

web members arranged peripherally to the pipe joint; and said compensation flange means being rigidly connected to said second flange member by means of said web members.

6. The cardan-type pipe joint as defined in claim 4, further including:

a plurality of said corrugated pipes;

a respective supporting ring for each said corrugated pipe;

said supporting rings being arranged in spaced relationship substantially concentrically within said corrugated pipes; and said supporting rings being formed by said first and second pipe sections of said first and second flanges for attachment to said two main pipe sections.

7. A cardan-type pipe joint with compensation for longitudinal expansion of two main pipe sections to be connected within a piping run, comprising:

the pipe joint having a longitudinal axis;

the pipe joint having a peripheral direction;

the two main pipe sections to be joined having a longitudinal direction;

a first pipe section and a second pipe section for attachment to said two main pipe sections;

a first flange member provided for said first pipe section;

a second flange member provided for said second pipe section;

a corrugated pipe for permitting longitudinal motion of said flange members relative to one another by means of bellows action and having a first end and a second end;

said first end of said corrugated pipe being fixedly attached to said first flange member;

said second end of said corrugated pipe being fixedly attached to said second flange member; a cardan joint for permitting angular motions and axially longitudinal motions of said first flange member and said second flange member relative to one another and having two pairs of bolts;

said two pairs of bolts being arranged substantially in a plane extending perpendicular to said longitudinal axis of the pipe joint and being spaced at substantially 90° from one another in said peripheral direction of the pipe joint;

said first flange member being provided with a pair of fork links and a pair of single links;

said second flange member being provided with a pair of single links and a pair of fork links;

each bolt of said two pairs of bolts being journaled in a respective one of said fork links as well as in a respective one of said single links engaging said respective one of said fork links;

said two pairs of bolts being journaled to be translatable in said longitudinal direction of the two main pipe sections to be joined;

each bolt of said two pairs of bolts having a bolt axis;

said first and second flange members having a central axis;

said single links being provided with elongated slots having major axes extending in a direction substantially parallel to said central axis of said first and second flange member;

each bolt of said two pairs of bolts being journaled in said fork links substantially free of play in a direction substantially perpendicular to said bolt axis;

each bolt of said two pairs of bolts being translatably journaled in said elongated slots in said single links; and said single links engaging in said fork links with appreciable play in a direction extending substantially parallel to said bolt axes.

8. The cardan-type pipe joint as defined in claim 7, further including:

a compensation flange means for compensating longitudinal forces arising from internal pressure;

web members arranged peripherally to the pipe joint; and said compensation flange means being rigidly connected to said second flange member by means of said web members.

9. The cardan-type pipe joint as defined in claim 7, further including:

a plurality of said corrugated pipes;

a respective supporting ring for each said corrugated pipe;

said supporting rings being arranged in spaced relationship substantially concentrically within said corrugated pipes; and said supporting rings being formed by said first and second pipe sections of said first and second flange for attachment to said two main pipe sections.

* * * * *

UNITED STATES PATENT AND TRADEMARK OFFICE
CERTIFICATE OF CORRECTION

PATENT NO. : 4,487,436
DATED : December 11, 1984
INVENTOR(S) : OTAKAR MARES

It is certified that error appears in the above-identified patent and that said Letters Patent is hereby corrected as shown below:

Column 2, line 29, please delete "econical" and insert --economical--

Column 6, line 22, please delete "embodiment" and insert --embodiments--

Column 5, line 21, after "without" please delete "and" (first occurrence) and insert --any--

*Signed and Sealed this*

*Twenty-fifth* Day of *June 1985*

[SEAL]

*Attest:*

DONALD J. QUIGG

*Attesting Officer*    *Acting Commissioner of Patents and Trademarks*